June 18, 1929.  A. C. HOECKER  1,717,686
JACK AND BUMPER FOR AUTOMOBILES
Filed Feb. 2, 1927   2 Sheets-Sheet 1
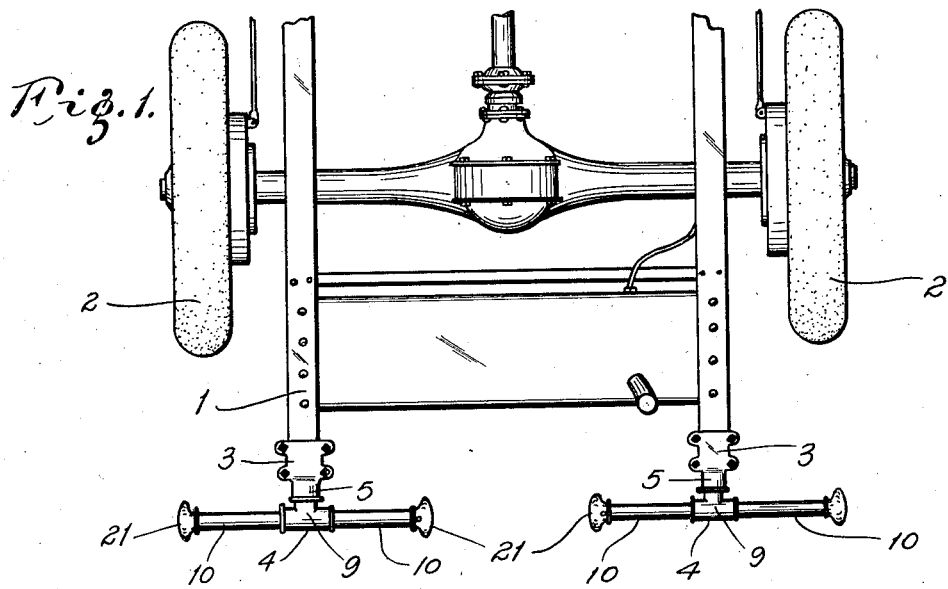
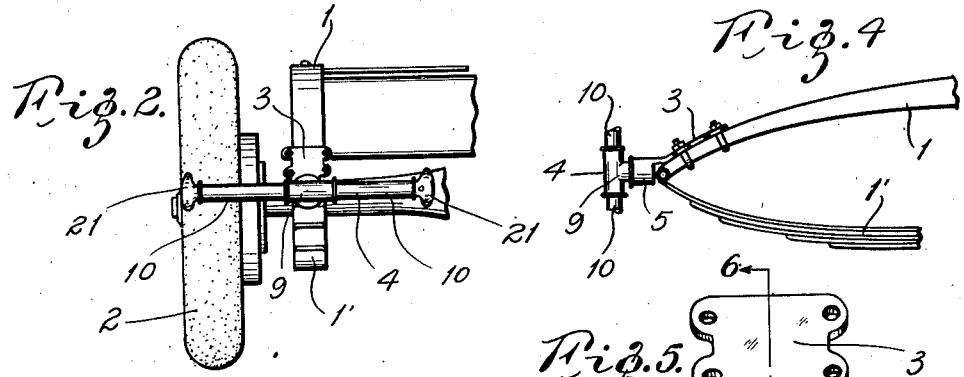
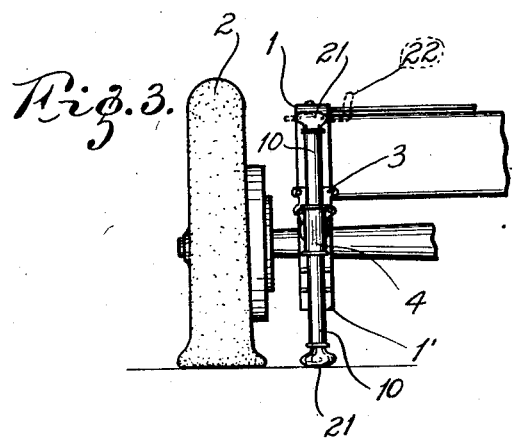
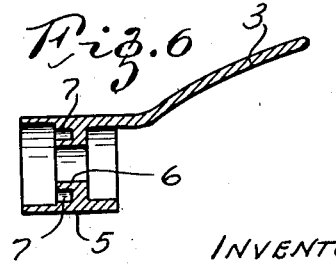
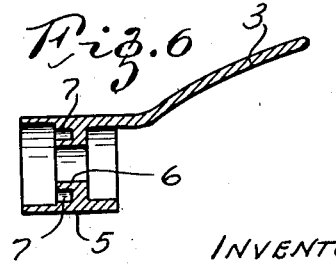
INVENTOR:
Albert C. Hoecker.

June 18, 1929.  A. C. HOECKER  1,717,686
JACK AND BUMPER FOR AUTOMOBILES
Filed Feb. 2, 1927   2 Sheets-Sheet 2
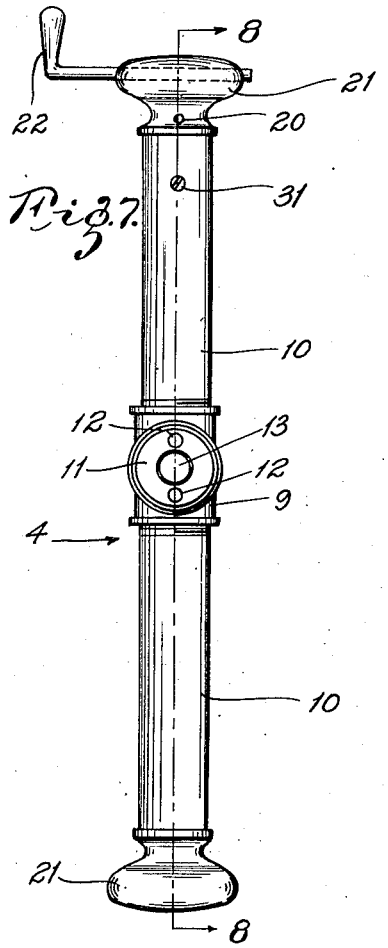
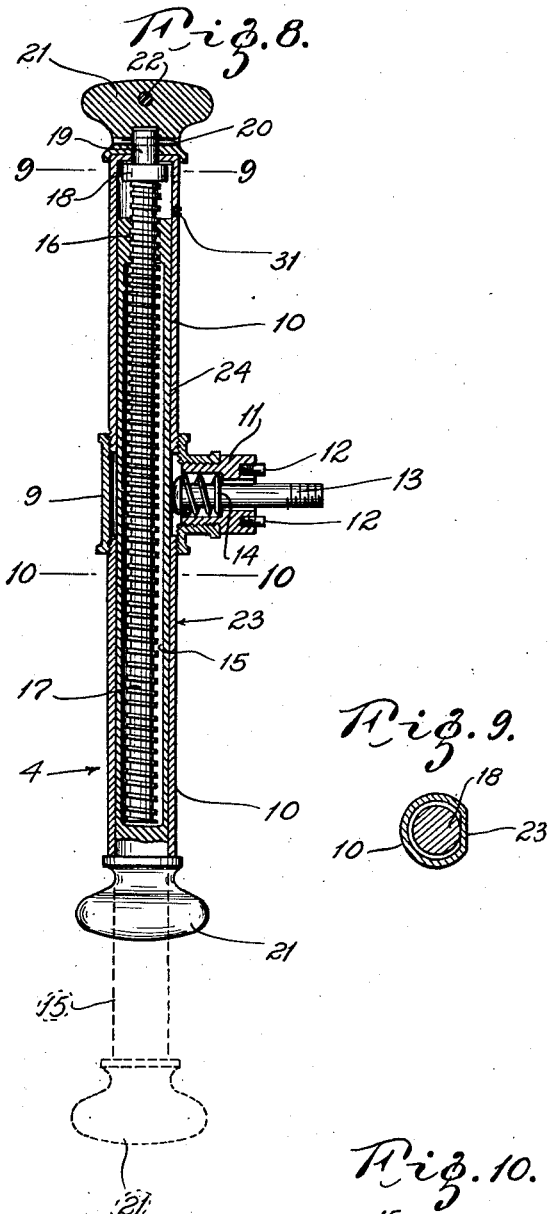
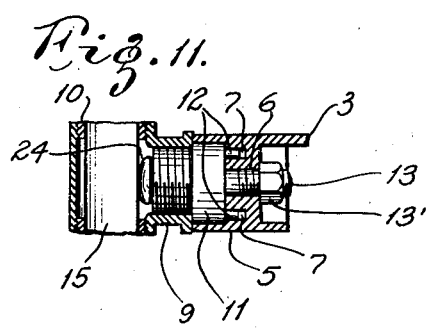
INVENTOR:
Albert C. Hoecker.

Patented June 18, 1929.

1,717,686

UNITED STATES PATENT OFFICE.

ALBERT C. HOECKER, OF ST. LOUIS, MISSOURI.

JACK AND BUMPER FOR AUTOMOBILES.

Application filed February 2, 1927. Serial No. 165,472.

My invention relates to improvements in jacks and bumpers for automobiles or other vehicles, and the main object of the invention is to provide a combination jack and bumper which can be attached to an automobile at any convenient part thereof.

Another object of the invention is to provide a jack which can be attached to the bumper which may already be on the car.

Another object of the invention is to provide a jack that can be attached to the vehicle at most any angle.

Another object of the invention is to provide a jack in which all, or nearly all of the moving parts are inclosed so as to prevent rust or dirt getting in the moving parts.

Another object is to provide a jack which is ornamental as well as useful.

With the above and other objects in view, my invention consists in the peculiar combination and arrangements of parts that are hereinafter described in detail, and specifically pointed out in the appended claims, and illustrated in the accompanying drawings in which:

Fig. 1 is a plan view of the rear of the chassis showing the invention applied as a bumperette.

Fig. 2 is a rear view of half of the chassis with bumperettes.

Fig. 3 is a view of the bumperette used as a jack.

Fig. 4 is a view showing the method of securing the bumperette to the chassis.

Fig. 5 is a front view of the clamp which secures the bumperette to the chassis.

Fig. 6 is a section through the clamp on line 6—6 of Fig. 5.

Fig. 7 is an elevation of the bumperette.

Fig. 8 is a vertical section taken on line 8—8 of Fig. 7.

Fig. 9 is a section on line 9—9 of Fig 8.

Fig. 10 is a section on line 10—10 of Fig. 8.

Fig. 11 is a fragmental section showing means of mounting bumperette in clamp.

Like characters of reference designate corresponding parts throughout the several views:

According to this invention, I am showing the bumper, commonly called bumperette 4, attached to the rear of an automobile chassis 1, as shown in Fig. 1.

I prefer bumperettes on the rear of automobiles, due to the fact that greater access may be had to the spare tires, gas tank, etc.

The invention comprises a longitudinal housing 10, and a ball or ornament 21 at each end. In the housing, I provide a jack 15 as shown in Fig. 8. The jack is adapted to reciprocate in the housing 10 by the screw 17 which is threaded in the nut 16 of the jack 15. The screw is held in the housing by a collar 18, which is part of the screw 17. The extension 19 of the screw extends through the aperture in the closed end of the housing 10, and is keyed to the ball 21 by a small pin 20.

Thus, it will be seen that the screw 17 cannot move longitudinally. However, there is clearance for the screw to turn circumferentially.

In one of the balls 21 is an aperture 22 for the introduction of a detachable operating tool. The tool is also numbered 22. On close inspection, it will be seen that the jack 15, or reciprocating leg must not turn circumferentially in the housing 10, due to the fact that if the jack 15 did turn while the screw was being turned, the jack 15 would not lengthen out as shown in the dotted lines Fig. 8.

To prevent the jack 15 from turning in the cylindrical housing, the jack 15 has one side flattened, as shown at 24 in Fig. 10. The housing 10 is also flattened, as shown at 23 in Fig. 10.

The jack 15 is threaded at 16 with a left hand thread. This threaded part 16 of the jack 15 cooperates with the threaded screw 17 which is also a left hand thread.

Thus, it will be seen that if the detachable operating tool 22 is turned to the right, the screw 17 will force the jack 15 out of the housing 10, as shown in the dotted line 15 in Fig. 8.

So, it is evident that if the jack housing were clamped to the vehicle, and the handle 22 inserted in the opening, which is also numbered 22, and the handle turned to the right, the jack 15 would lengthen out, and, as the base 21 of the jack 15 would come in contact with the base on which the vehicle may be standing, the vehicle would be raised. Then, if the handle 22 was turned to the left, the vehicle would be lowered.

Having thus described the jack, I will now describe the jack as a bumper, and the different ways of attaching the bumper to a vehicle chassis. As previously stated, I prefer using the jack as a bumperette on the rear of an automobile, due to the fact that free access may be had to the spare tire, gas tank, etc.

To attach the bumperette or jack to the chassis 1, I provide a specially constructed clamp 3 and socket 5. This socket is plainly shown in Fig. 11.

One of these sockets 5, has a cylindrical opening extending longitudinally of the clamp 3. Circumferentially around, and in the one end of the socket 5, are four apertures 7 and 8, as shown in Fig. 5. Through the center of the apertured partition is another larger aperture 6. At the rear of the central partition, there is another cylindrical opening.

The clamp 3 and socket 5 are clamped to the longitudinal ends of the chassis 1, as shown in Fig. 4. The object of this special socket will be explained later.

In the T 9, which is part of the bumper or jack housing 10, is a plug 11 which is screwed or otherwise fastened to the T 9. In the end of this plug, are two pins 12. The plug 11, and pins 12, are shaped to fit in the socket 5, as shown in Fig. 11.

In the end of the plug 11, which is nearest the jack 15, is a spring 14, as shown in Fig. 8. Centrally through the socket 5, and plug 11 is an opening. Through this opening, and through the center of the spring 14 is a bolt 13. At one end of the bolt 13, is a head or offset portion 24, which is large enough in diameter to prevent the head from pulling through the spring when pressure is brought to bear on the spring.

At the other end of the bolt 13 is a nut 13' which is screwed on the bolt. The special socket and jack housing 10 or bumperette are then assembled as shown in Fig. 11. The complete bumperette or jack is then clamped to the ends of the chassis, as shown in Fig. 1. In this position, the bumperettes are connected transversely of the chassis 1. In Fig. 4, the jack or bumperette is shown in a vertical position.

It is for this purpose that I provide the special socket shown in Fig. 11.

To operate the jack as a bumperette shown in the horizontal position Fig. 1 and Fig. 2, the pins 12 and plug 11, which are attached to the bumperette or jack, are turned in the socket 5 until the pins 12—12 of the plug, are in line with the apertures 8—8 of the clamp socket 5.

To operate the bumperette as a jack, the bumper is pulled longitudinally out of the socket. This pulling effect will cause the spring 14 to compress, allowing the pins 12—12 to pull out of the apertures 8—8, whereupon the bumperette 10 or jack is turned to the right or left until the pins 12—12 enter the apertures 7—7. As the bumperette is released, the spring 14 will push the pins 12—12 snugly into the apertures 7—7. The jack will then be in the vertical position, shown in Fig. 3. This is as the jack should be for raising or lowering the vehicle.

To raise the vehicle, the detachable handle 22 is inserted in the opening in the ball 21, as shown in the dotted lines, Fig. 3. The handle 22 is then turned to the right, and as the ball 21 is attached to the screw 17, and as the screw 17 is turned in the threaded nut 16 in the jack 15, the jack 15 will be forced out of the housing or bumperette, as shown in the dotted lines Fig. 8, thus raising the vehicle so that a tire may be changed or other repairs made.

To lower the vehicle, the handle or lever is turned to the left, thus drawing the jack back in the housing or bumpetette 10, as shown in Fig. 7. On close inspection, it will be seen that if the lever is turned to the left, the ball 21 or base of the jack 15, will be drawn against the end of the bumperette or housing 10. This drawing effect will also cause the ball 21, which is attached to the screw 16, to also draw up against the upper end of the housing, thus preventing water, dust, etc., from getting into the working parts of the jack.

To oil the jack, the plug 31 is removed so that oil may be injected into the housing, thus further preventing rusting of the moving parts.

Having thus described my invention, what I claim and desire to secure by Letters Patent is:

1. A combined bumper and lifting jack for a vehicle comprising a pair of telescoping tubular members having mechanically operated means enclosed therein, operating means extending from one of said members for forcing one of said members outwardly from said other member, and means on one of said members for securing it to the vehicle.

2. A combined bumper and lifting jack for a vehicle comprising a pair of telescoping tubular members having mechanically operated means enclosed therein, operating means extending from one of said members for forcing one of said members outwardly from said other member, and means on one of said members for turnably securing it to the vehicle.

3. A bumperette for a vehicle comprising a swingable member, a pushing element in said member, supporting means for said element, and resilient means for holding said member against said supporting means.

4. A bumperette for a vehicle comprising a swingable member, a pushing element in said member, means for holding said member in either a vertical or horizontal position, supporting means for said element, and resilient means for holding said member against said supporting means.

5. A combined bumper and lifting jack for a vehicle comprising a swingable member having an outwardly forceable element adapted to be operated when said member is swung and held in a vertical position, a support for said member, and resilient means for holding said member against said support.

6. A bumperette for a vehicle comprising a swingable member, a pushing element in said member, releasable means for holding said member in either a vertical or a horizontal position, a support for said member, and resilient means for holding said member against said support.

7. A combined bumperette and lifting jack for a vehicle comprising a member having an axis disposed angularly thereto, a support for said axis extending from the vehicle, and outwardly forceable means carried by said member, said member adapted to be moved outwardly from said support for permitting said member to be swung to different positions.

8. A combined bumperette and lifting jack for a vehicle comprising a member having an axis disposed angularly thereto, a support for said axis extending from the vehicle, outwardly forceable means carried by said member, said member adapted to be moved outwardly from said support for permitting said member to be swung to different positions, and means for holding said member inwardly against said support.

9. A combined bumper and lifting jack for a vehicle comprising a pair of swingably held telescoping members having an operating element for pushing one of said members outwardly from the other member.

10. A combined bumper and lifting jack for a vehicle comprising a pair of swingably held telescoping members having an operating element for pushing one of said members outwardly from the other member, said members adapted to be swung to either a horizontal or a vertical position, and locking means for holding said members in either position.

11. A combined bumper and lifting jack for a vehicle comprising a horizontally disposed member, a jack carried by said member, means provided whereby said member can be swung and sustained in a vertical position, and means for projecting said jack from said member when said member is in a vertical position.

ALBERT C. HOECKER.